US012350857B2

(12) United States Patent
Chang

(10) Patent No.: US 12,350,857 B2
(45) Date of Patent: Jul. 8, 2025

(54) EDGE BAND CUTTING DEVICE OF EDGE BANDING MACHINE

(71) Applicant: OAV EQUIPMENT AND TOOLS, INC., Taichung (TW)

(72) Inventor: Yen-Tsung Chang, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 310 days.

(21) Appl. No.: 18/150,090

(22) Filed: Jan. 4, 2023

(65) Prior Publication Data

US 2024/0139986 A1 May 2, 2024

(30) Foreign Application Priority Data

Nov. 1, 2022 (TW) ................................. 111141654

(51) Int. Cl.
*B27B 33/20* (2006.01)
*B27L 5/00* (2006.01)
*B27L 5/08* (2006.01)

(52) U.S. Cl.
CPC .............. *B27B 33/20* (2013.01); *B27L 5/008* (2013.01); *B27L 5/08* (2013.01)

(58) Field of Classification Search
CPC ........... B27B 33/20; B27B 5/20; B27B 27/10; B27B 1/002; B27D 5/009; B27L 5/008; B27L 5/08; B26D 1/04; B26D 1/16; B28D 1/048; B28D 1/044; B23D 47/042; B23D 45/12; B23D 47/04; B27M 3/02
USPC ......... 83/262, 212, 176, 289, 305, 318, 329, 83/268, 71, 364, 471.3, 485
See application file for complete search history.

(56) References Cited

U.S. PATENT DOCUMENTS

| | | | | | |
|---|---|---|---|---|---|
| 2,007,823 | A * | 7/1935 | Campbell | B26D 1/143 | 83/729 |
| 2,209,995 | A * | 8/1940 | Morris | B23D 45/20 | 83/287 |
| 2,293,260 | A * | 8/1942 | Johnston | B23D 45/20 | 83/319 |
| 2,747,633 | A * | 5/1956 | Burlin | B26D 7/0616 | 83/167 |
| 3,044,336 | A * | 7/1962 | Bock | B23D 45/20 | 83/319 |
| 3,207,192 | A * | 9/1965 | Dennison | B27M 3/02 | 144/371 |

(Continued)

*Primary Examiner* — Ghassem Alie
(74) *Attorney, Agent, or Firm* — MUNCY, GEISSLER, OLDS & LOWE, P.C.

(57) ABSTRACT

An edge band cutting device includes a base reciprocated along a direction parallel to a conveying path between a front cutting position and a rear cutting position, a baffle component disposed to the base and having a baffle configured to be reciprocated along a direction parallel to the conveying path between an initial position and a compression position, and reciprocated along a direction perpendicular to the conveying path between a lifting position and a lowering position, and a cutting component disposed to the base and having a saw blade configured to be reciprocated up and down along a cutting path perpendicular to the conveying path. By operation of the baffle component and the cutting component, only one saw blade is used to cut a front protrusion and a rear protrusion of an edge band, such that the structural design is greatly simplified.

10 Claims, 12 Drawing Sheets

(56) References Cited

U.S. PATENT DOCUMENTS 3,612,119 A * 10/1971 Neild ...................... B27B 29/08
144/29
3,830,125 A * 8/1974 Carmien .................. B26D 1/04
83/262
3,910,142 A * 10/1975 Jureit ........................ B27B 5/20
83/485
4,370,140 A * 1/1983 Fegley ..................... B26D 1/60
83/318

* cited by examiner

EDGE BAND CUTTING DEVICE OF EDGE BANDING MACHINE

BACKGROUND OF THE INVENTION

1. Field of the Invention

The present invention relates to an edge banding machine and more particularly, to an edge band cutting device of an edge banding machine.

2. Description of the Related Art

An edge banding machine is a woodworking automation machine for gluing an edge band to the edge of a plank and trimming the edge of the plank. As far as the mechanical processing of the edge banding machine is concerned, the plank is processed by a plurality of steps of positioning, pre-milling, glue applying, attaching the edge band, and cutting the edge band. In the process of cutting the edge band, the traditional design uses two saw blades to cut the parts of the edge band protruding out of the front and rear ends of the plank, respectively. However, the overall structure becomes crowded and complex due to the arrangement of the two aforesaid saw blades, and the equipment cost is also raised. Further, when the specification of the plank changes, the distance between the saw blades needs to be adjusted. This will cause trouble and inconvenience in work and greatly reduce production efficiency of the edge banding machine.

SUMMARY OF THE INVENTION

It is a primary objective of the present invention to provide an edge band cutting device of the edge banding machine, which simplifies structure, reduces equipment cost, increases cutting accuracy, and enhances production efficiency.

To attain the above objective, the edge band cutting device of the present invention comprises base, a baffle component, and a cutting component. The base is reciprocated along a direction parallel to a conveying path between a front cutting position and a rear cutting position. The baffle component is disposed to the base and includes a baffle configured to be reciprocated along a direction parallel to the conveying path between an initial position and a compression position, and reciprocated along a direction perpendicular to the conveying path between a lifting position and a lowering position. The cutting component is disposed to the base and includes a saw blade configured to be reciprocated up and down along a cutting path perpendicular to the conveying path. When the base is located at the front cutting position, and the baffle located at the initial position is located at the lifting position, the baffle is pushed by a front abutting surface of a plank to move from the initial position to the compression position for allowing the saw blade to move along the cutting path and cut a front protrusion of an edge band. When the base is located at the rear cutting position, and the baffle located at the initial position is located at the lifting position, the baffle is abutted with a rear abutting surface of the plank for allowing the saw blade to move along the cutting path and cut a rear protrusion of the edge band.

It can be seen from the above that the edge band cutting device of the present invention uses the reciprocal movement of the base between the front and rear cutting positions with the reciprocal movement of the baffle between the initial position and compression position and the reciprocal movement of the baffle between the lifting position and lowering position, such that the cutting component provides only one saw blade configured to cut along the cutting path for cutting. In this way, the structural design is simplified and the equipment cost is saved, and further, the front protrusion and the rear protrusion can be cut precisely for increasing cutting accuracy. Even if the plank has different specifications, there is no need to re-adjust the structural configuration for achieving the effect of enhancing production efficiency.

Preferably, the edge banding device further includes a base rail arranged along a direction parallel to the conveying path. The base is reciprocated along the base rail between the front cutting position and the rear cutting position.

Preferably, the baffle component includes a baffle fixing seat mounted to the base, a baffle horizontal rail movably passing through the baffle fixing seat, a lateral plate disposed at one end of the baffle horizontal rail, the baffle disposed at the other end of the baffle horizontal rail, a first stopper disposed to the baffle, and an elastic member providing an elastic member to the baffle for keeping the baffle in the initial position. When the baffle is pushed by the front abutting surface of the plank to move from the initial position to the compression position, the first stopper is abutted against the baffle fixing seat for limiting the position of the baffle. In this way, the plank is located at a correct cutting position by means of the abutment of the baffle.

Preferably, the baffle component further includes a second stopper disposed to the baffle fixing seat. When the baffle is pushed by the front abutting surface of the plank to move from the initial position to the compression position, the first stopper is abutted against the second stopper so as to be indirectly abutted against the baffle fixing seat, wherein the second stopper includes a nut fixed to the baffle fixing seat, and a bolt screwed to the nut and abutted against the first stopper when the baffle is located at the compression position. In this way, when the specification of the plank changes, the compression position can be adjusted by adjusting the threaded length of the bolt to keep the plank in a correct cutting position for processing.

Preferably, a vertical rail is provided to the base and arranged a direction vertical to the conveying path. The baffle fixing seat is driven by a baffle component driving cylinder to reciprocate up and down along the vertical rail so as to drive the baffle to move between the lifting position and the lowering position.

Preferably, a vertical rail is provided to the base and arranged a direction vertical to the conveying path. The cutting component includes a motor holder, a motor mounted to the motor holder, the saw blade driven by the motor to rotate, and a cutting component driving cylinder mounted to the base. The cutting component driving cylinder drives the motor holder to reciprocate up and down along the vertical rail so as to drive the saw blade to reciprocate up and down along the cutting path between a top dead point position and a bottom dead point position.

Preferably, the baffle component further includes a roller disposed to the baffle for abutting against the front abutting surface or the rear abutting surface of the plank, thereby preventing the front abutting surface or the rear abutting surface from getting damaged during processing.

Preferably, when the base is located at the front cutting position, and the baffle located at the compression position is located at the lifting position, the saw blade is located at a bottom dead point position so as to be moved from bottom to up along the cutting path to cut the front protrusion of the edge band. When the base is located at the rear cutting position, and the baffle located at the initial position is located at the lifting position, the saw blade is located at a top dead point position so as to be moved from up to bottom along the cutting path to cut the rear protrusion of the edge band. In this way, by means of the reciprocal movement of the saw blade along the cutting path between the top dead point position and the bottom dead point position, the entire processing is performed quickly and smoothly so as to greatly enhance production efficiency, thereby preparing for the cutting of the next plank.

Preferably, the baffle has a front surface and a rear surface. When the baffle is located at the compression position, the rear surface of the baffle is flushed with the saw blade, and when the baffle is located at the initial position, the front surface of the baffle is flushed with the saw blade. In this way, an operator takes the front and rear sides of the baffle as a reference for adjusting the saw blade.

Other advantages and features of the present invention will be fully understood by reference to the following specification in conjunction with the accompanying drawings, in which like reference signs denote like components of structure.

DETAILED DESCRIPTION OF THE INVENTION

Figure 1:
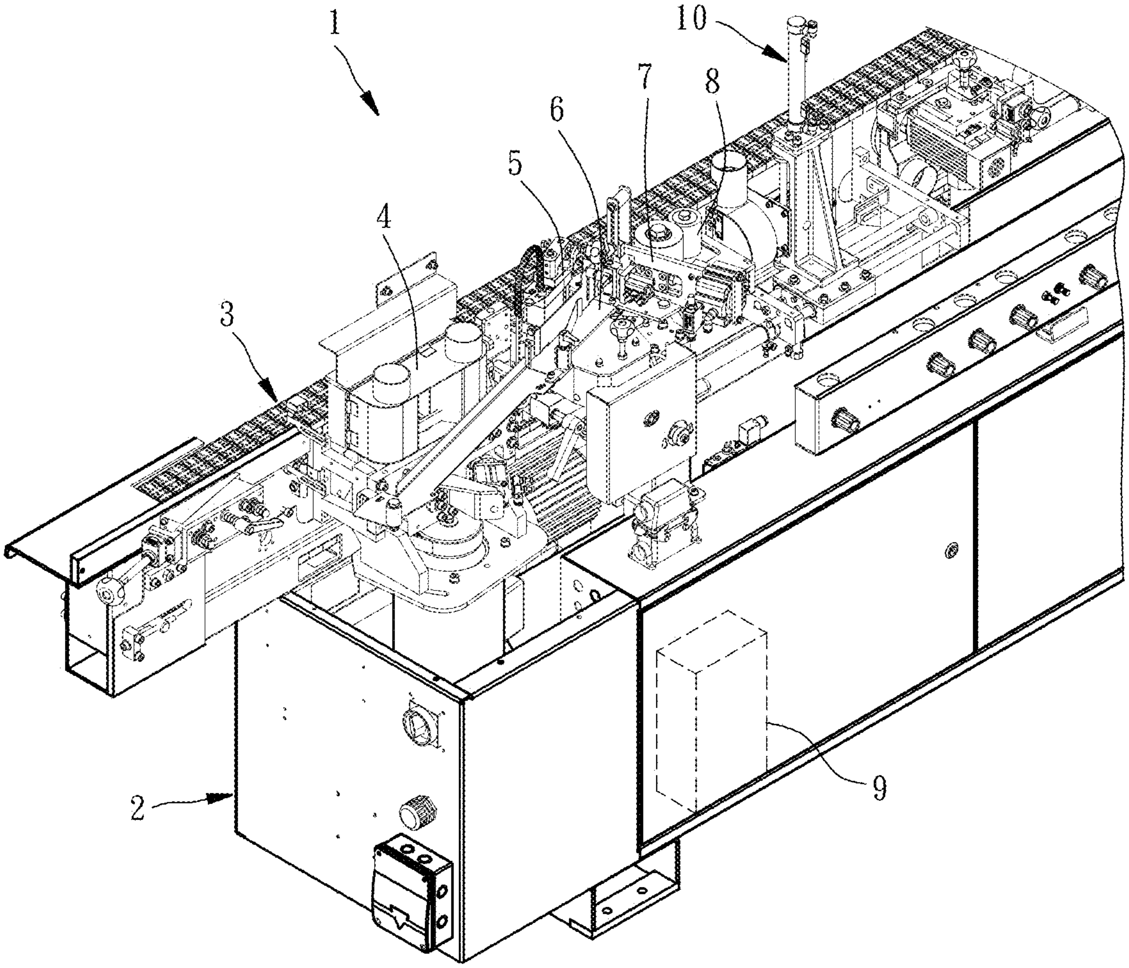
FIG. 1 is a partial perspective view of an edge banding machine using an edge cutting device of the present invention.
Figure 7:
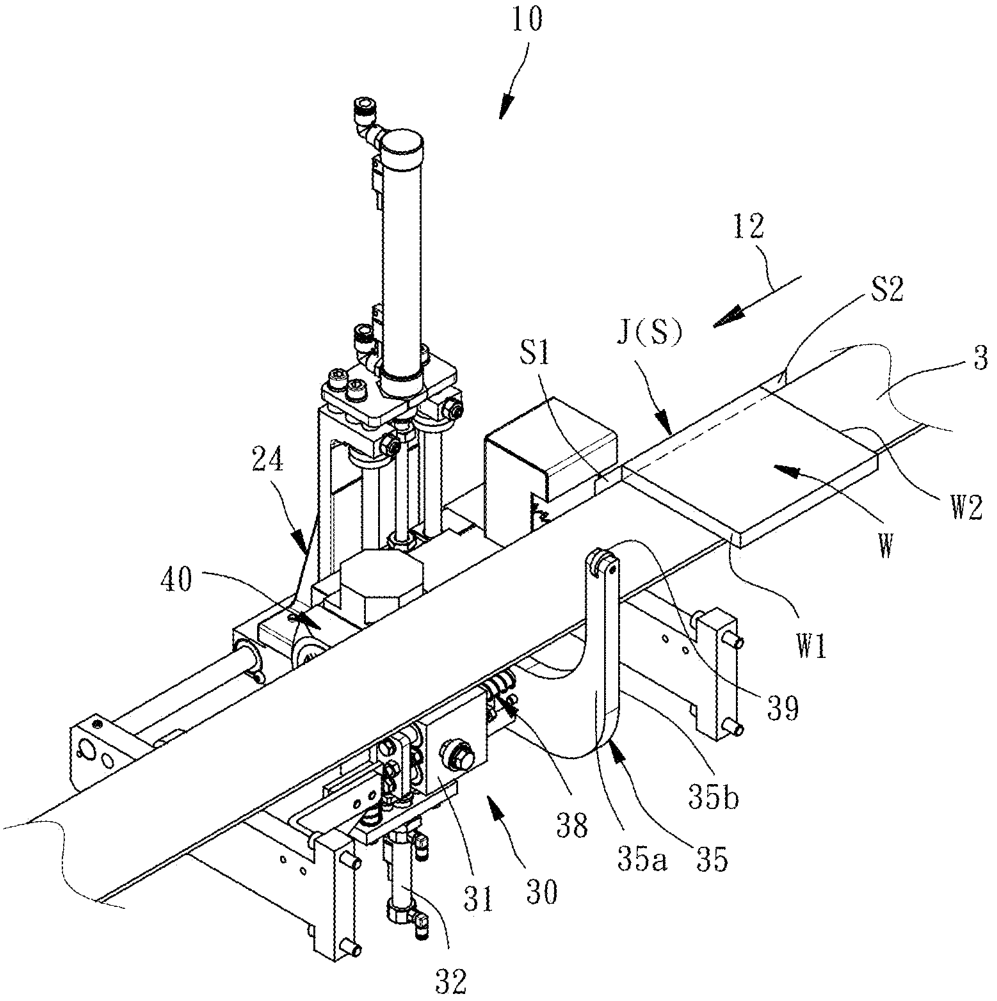
FIG. 7 is a perspective view of the edge cutting device of the present invention used with the conveyor belt, showing that the plank is about to reach the front cutting position, and the baffle is located at the initial position and the lifting position.

Referring to FIG. 1, an edge banding machine 1 shown in FIG. 1 comprises a machine body 2 and a conveyor belt 3 disposed on the machine body 2 to conveying a to-be-processed plank W (as shown in FIG. 7) for multi-station processing. In addition, a plurality of processing devices are provided on the machine body 2 and arranged in order of process. The aforesaid processing devices comprise a pre-milling device 4, a glue applying device 5, an edge band conveying device 6, a cutter 7, a horizontal pressing wheel set 8, and an edge band cutting device 10. The aforesaid processing devices are controller by a control system 9. The control system 9 can, but not limited to, be a programmable logic controller. The pre-milling device 4 is adapted to pre-mill a lateral side J of the plank W (as shown in FIG. 7) for enabling the plank W to have a specific width, thereby facilitating subsequent gluing. The glue applying device 5 is adapted to apply glue to the lateral side J of the plank W. An edge band S is conveyed by the edge band conveying device 6 and cut to a preset length by the cutter 7, such that the edge band S is tightly attached to the lateral side J of the plank W by the horizontal pressing wheel set 8. Finally, a front protrusion S1 and a rear protrusion S2 of the edge band S are cut by the edge band cutting device 10 for allowing the edge band S is flushed with a front abutting surface W1 and a rear abutting surface W2 of the plank W.

Figure 2:
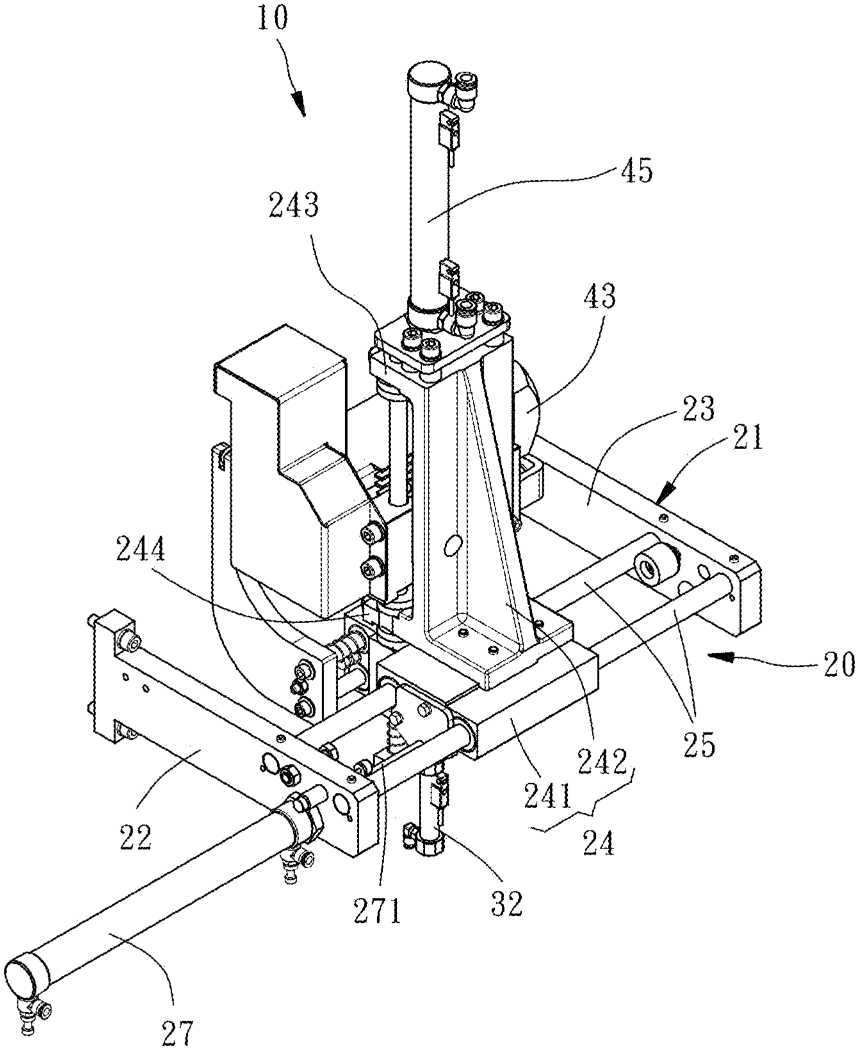
FIG. 2 is a perspective view of the edge cutting device of the present invention.
Figure 3:
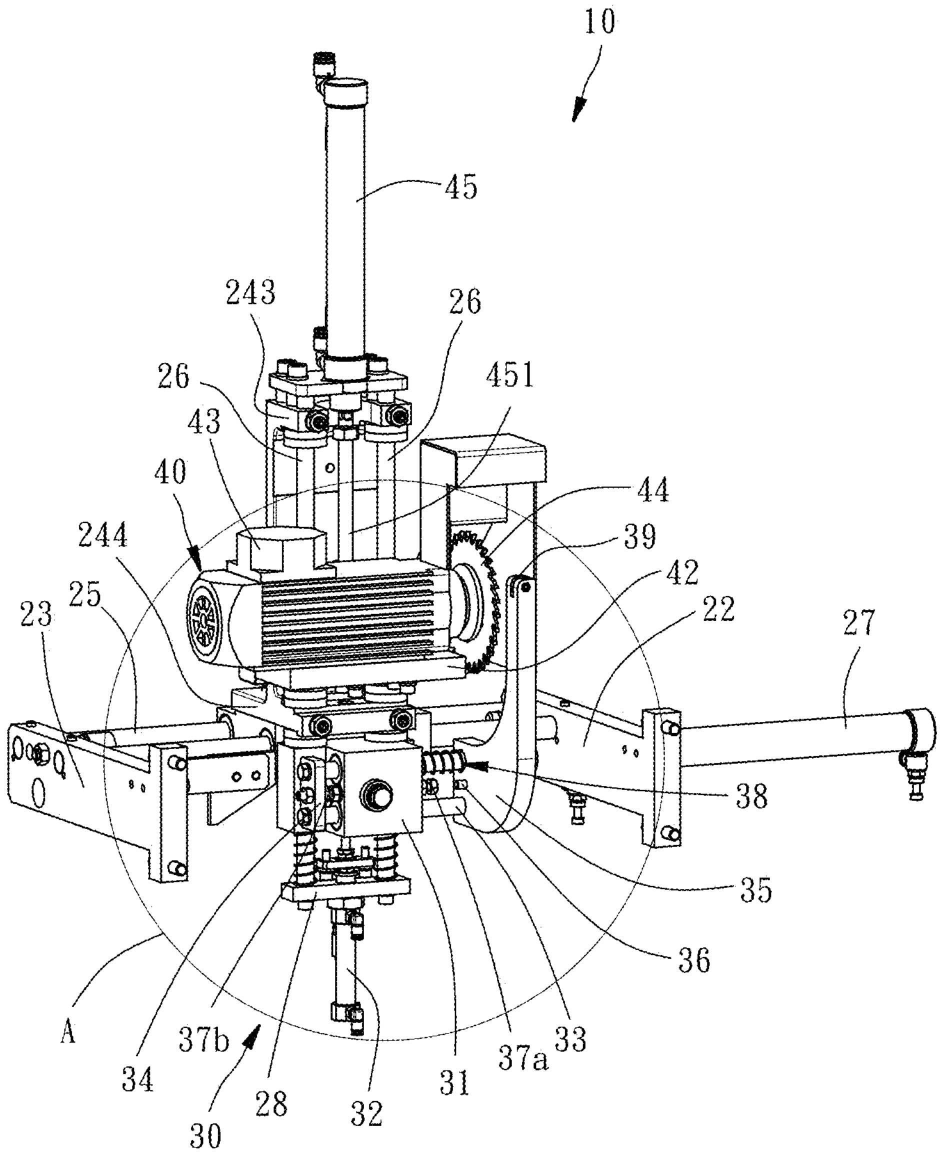
FIG. 3 is a perspective view of the edge cutting device of the present invention, showing that the edge cutting device is viewed from another perspective.

As shown in FIGS. 2 and 3, the edge band cutting device 10 of the present invention comprises a base component 20, a baffle component 30, and a cutting component 40.

Figure 11:
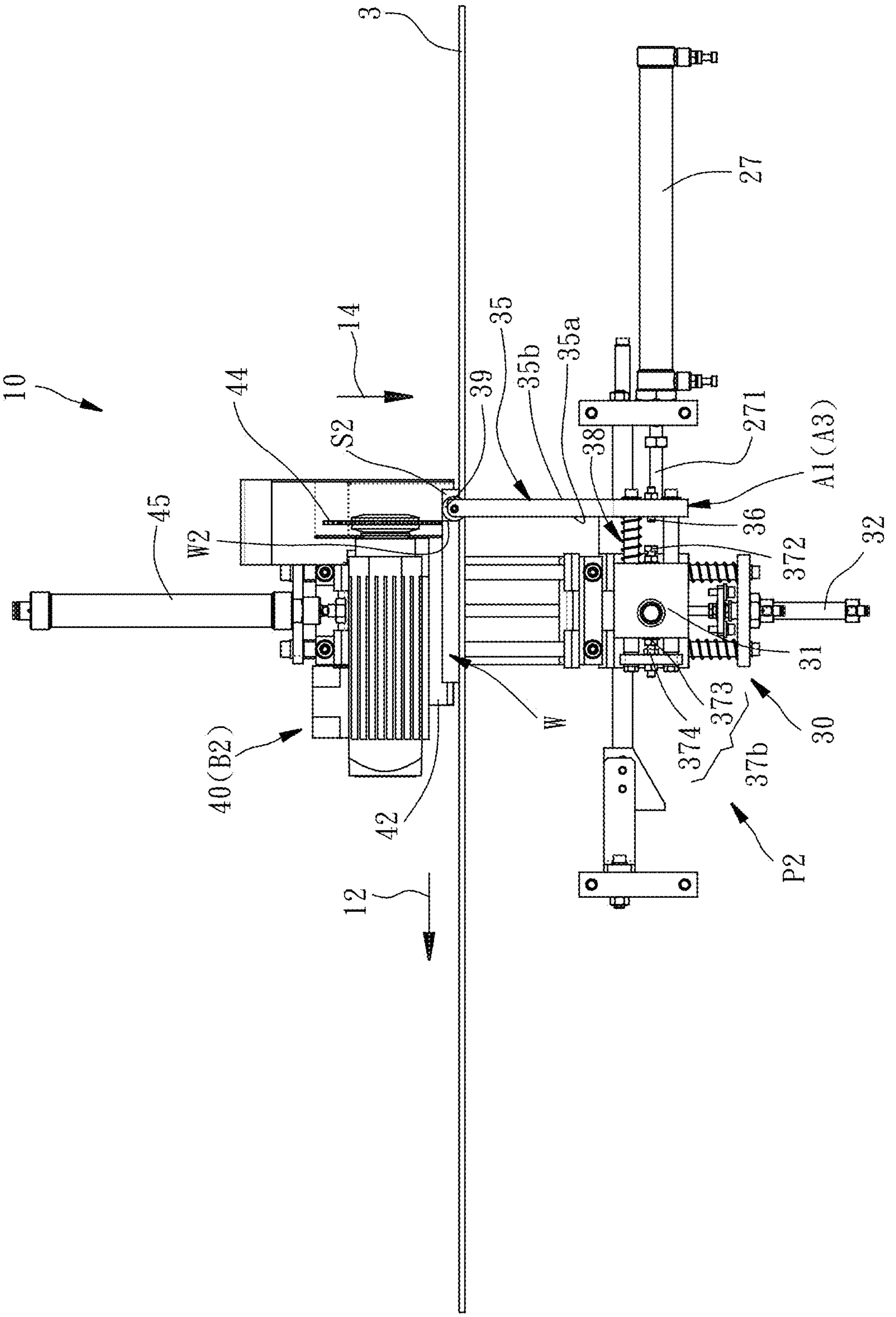
FIG. 11 is similar to FIG. 10, showing that the base is located at the rear cutting position, and the baffle is back to the initial position and the lifting position.

The base component 20 includes a bracket 21, a base 24, two base rails 25, two vertical rails 26, and a base driving cylinder 27. The bracket 21 has a rear plate 22 and front plate 23. The rear plate 22 and the front plate 23 are fixed to the machine body 2 of the edge banding machine 1. The base 24 has a bottom 241 and a vertical extending portion 242 connected with a top surface of the bottom 241. A top arm plate 243 and a bottom arm plate 244 (as shown in FIGS. 2 and 3) extend horizontally from the top and bottom ends of the vertical extending portion 242, respectively. The base rails 25 are arranged along a direction parallel to a convey path 12 (as shown in FIG. 7). The base rails 25 pass through the bottom 241 of the base 24 and are connected between the rear plate 22 and the front plate 23. The set direction of the vertical rail 26 is vertical to the set direction of the base rail 25. One ends of the vertical rails 26 are fixed to the top arm plate 243, and the other ends of the vertical rails 26 are penetrated through the bottom arm plate 244 and fixed to a bottom plate 28. The base driving cylinder 27 is set to the rear plate 22 of the bracket 21 and provided with a rod 271 (as shown in FIG. 4) connected with the bottom 241 of the base 24 through a rod 27, such that the base driving cylinder 27 drives the base 24 together with the vertical rails 26 to reciprocate along the base rails 25 between a front cutting position P1 (as shown in FIG. 8) and a rear cutting position P2 (as shown in FIG. 11).

Figure 4:
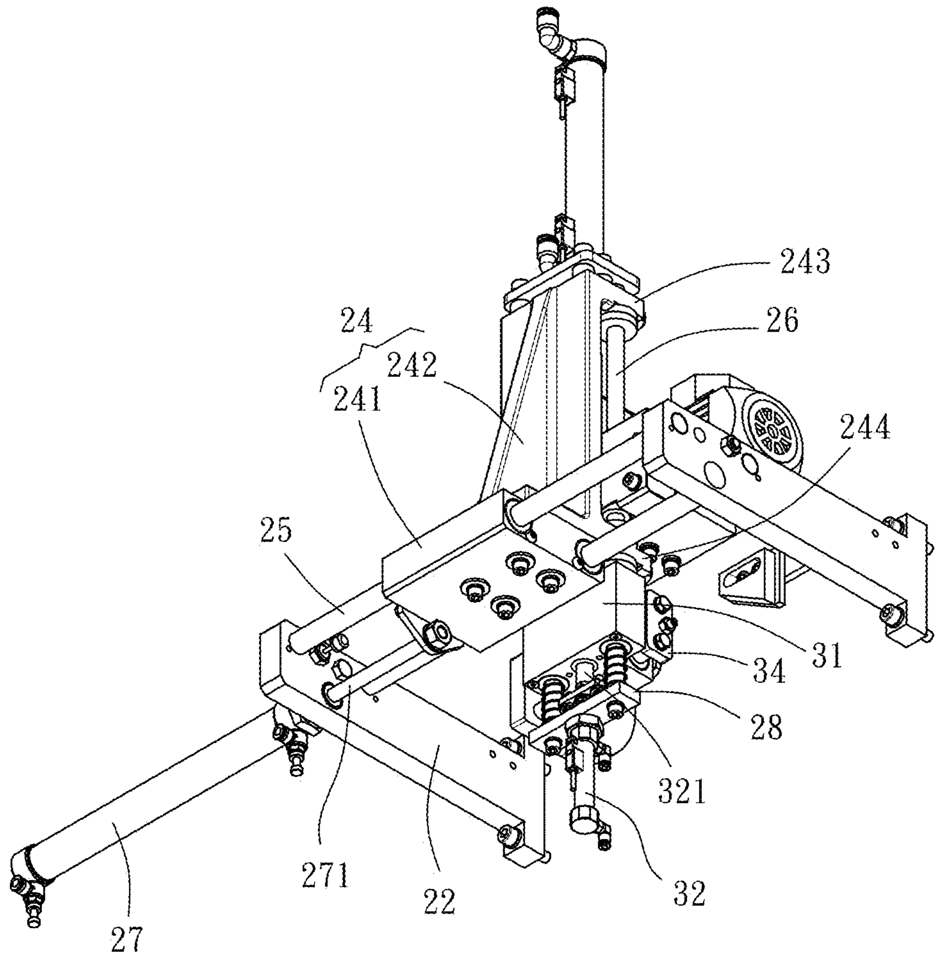
FIG. 4 is a bottom perspective view of the edge cutting device of the present invention, showing that the baffle component driving cylinder is arranged under the base.
Figure 5:
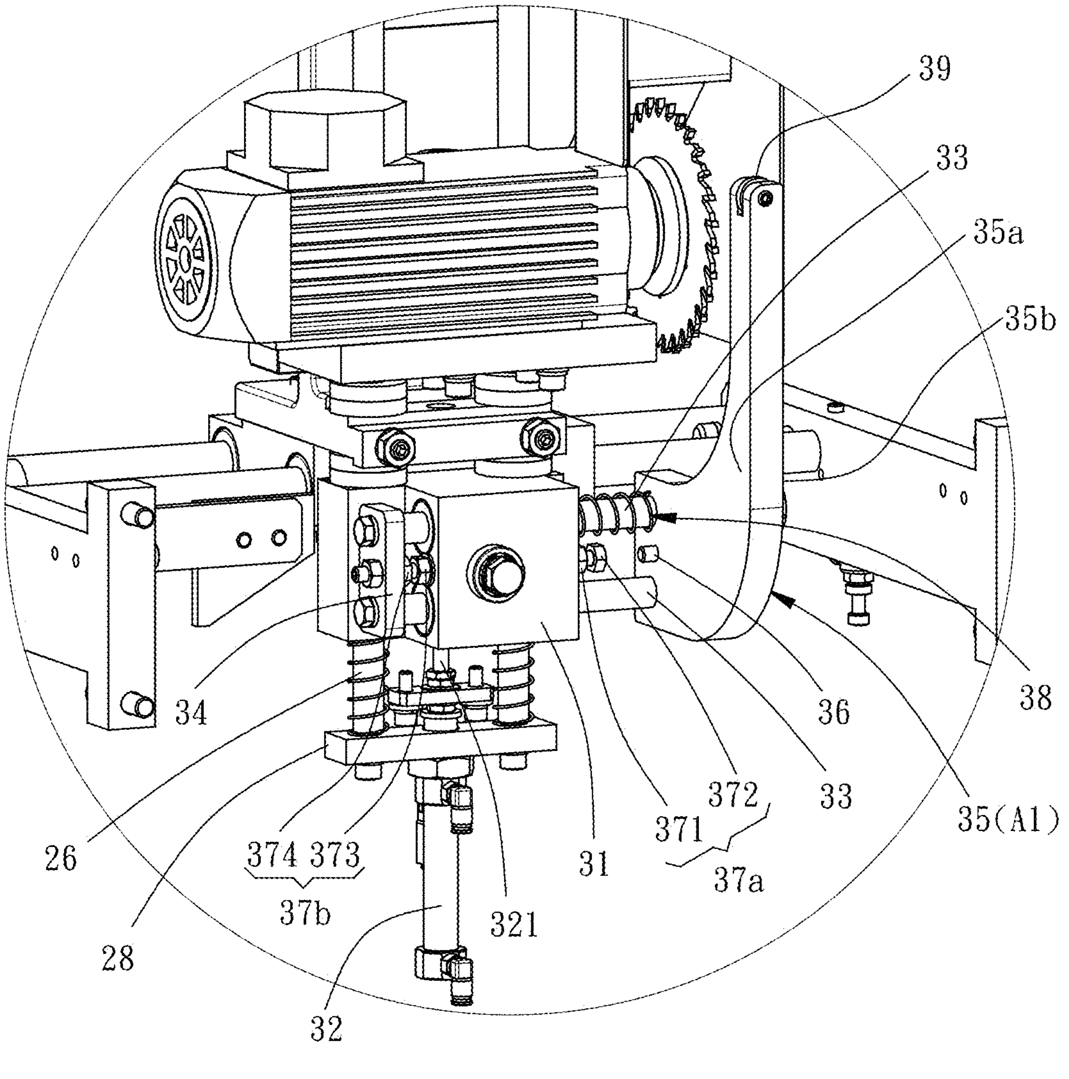
FIG. 5 is an enlarged view of a circle indicated by A of FIG. 3, showing that the first stopper, the second stopper, and the third stopper of the baffle component.
Figure 9:
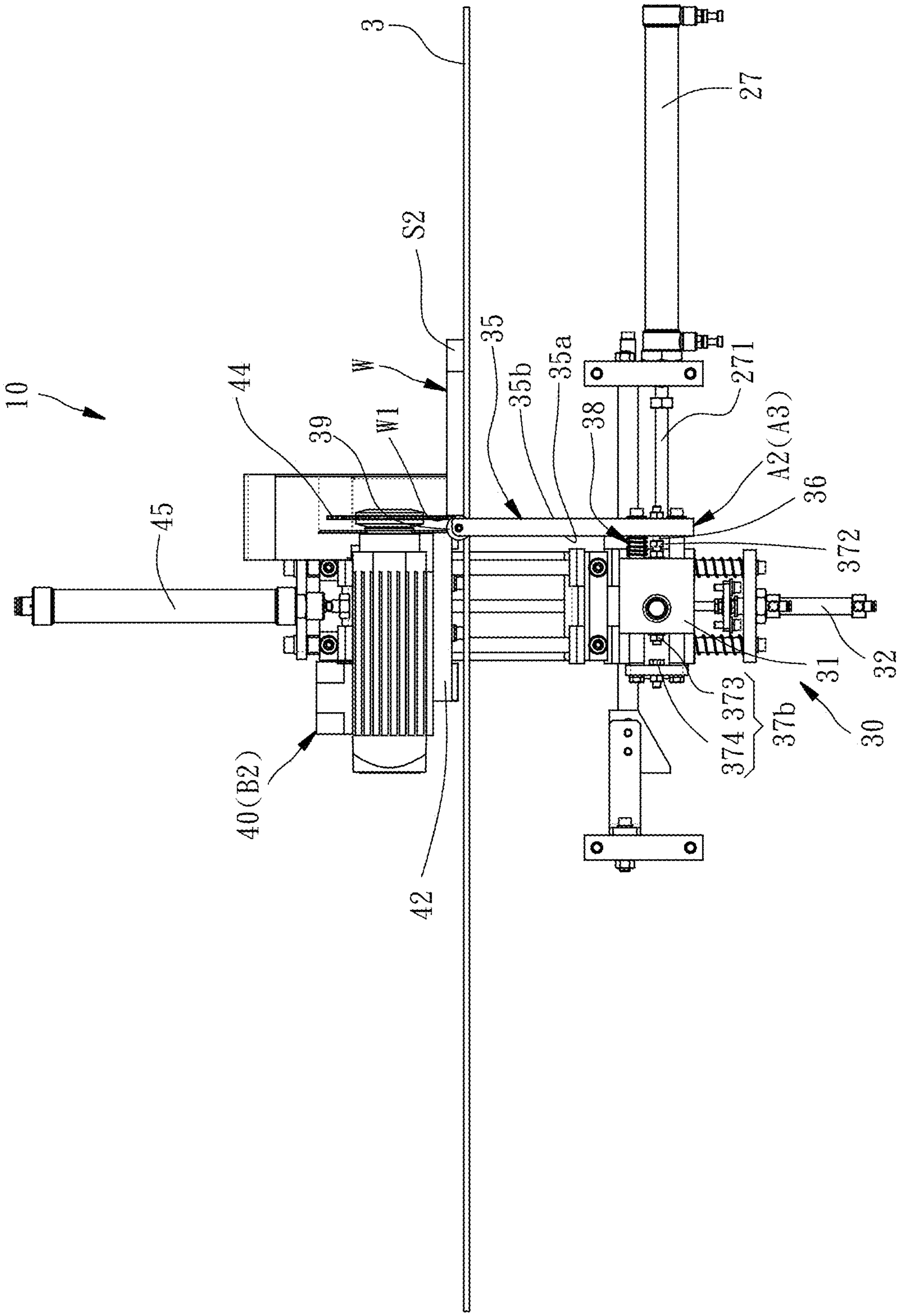
FIG. 9 is similar to FIG. 8, showing that the front protrusion of the edge band is cut by the saw blade, and the saw blade is located at the top dead point position.
Figure 10:
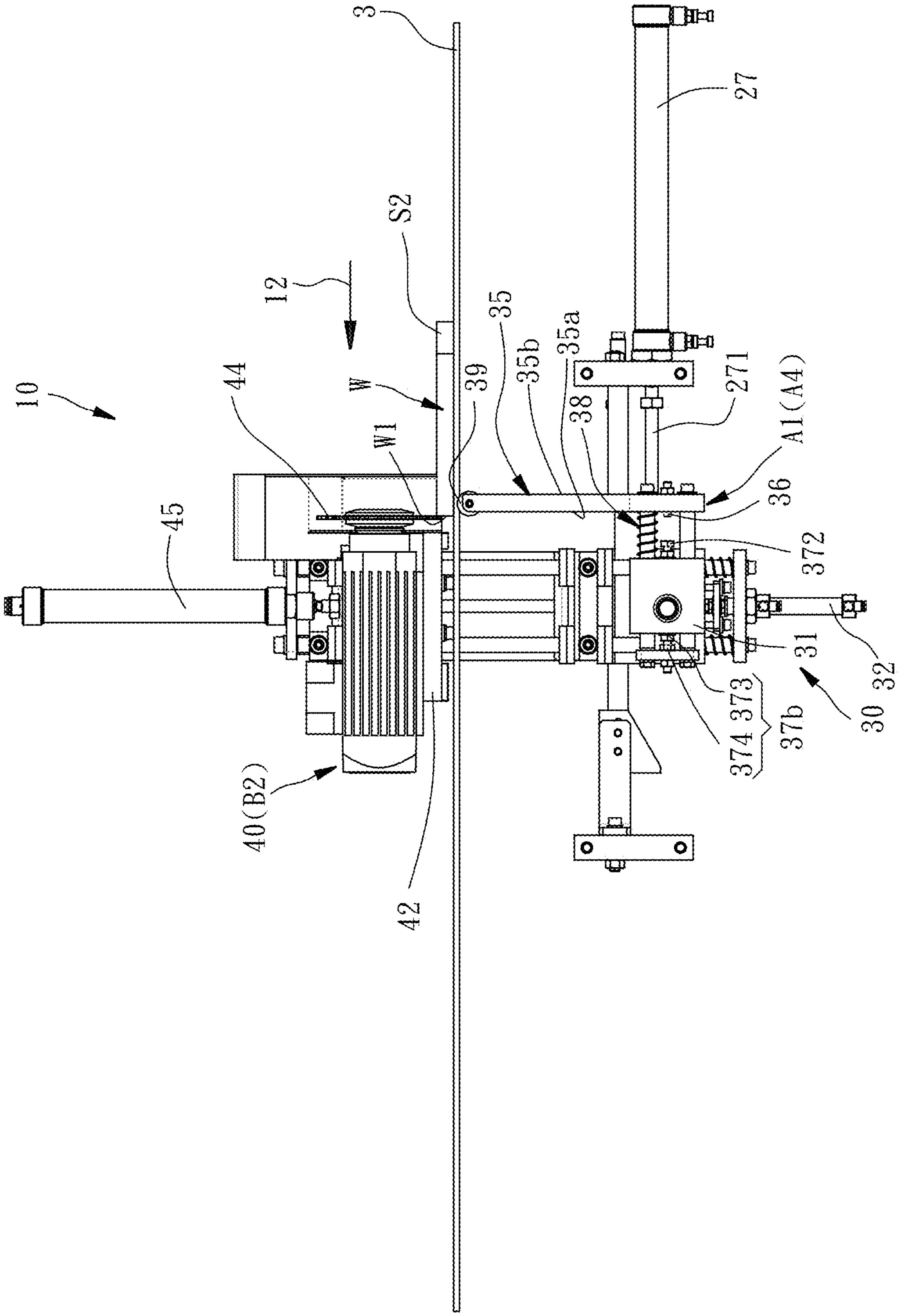
FIG. 10 is similar to FIG. 9, showing that the baffle is back to the initial position and the lowering position.

As shown in FIGS. 3 to 5, the baffle component 30 includes a baffle fixed seat 31, a baffle component driving cylinder 32, two baffle horizontal rails 33, a lateral plate 34, a baffle 35, a first stopper 36, a second stopper 37*a*, a third stopper 37*b*, an elastic member 38, and a roller 39. The baffle fixed seat 31 is located above the bottom plate 28 and penetrated by the vertical rails 26. The baffle component driving cylinder 32 is located under the baffle fixed seat 31 and fixed to the bottom 28 and provided with a rod 321 connected with the bottom of the baffle fixed seat 31 (as shown in FIG. 4), such that the baffle component driving cylinder 32 drives the baffle fixed seat 31 to reciprocate up and down along the vertical rails 26. The baffle horizontal rails 33 pass through the baffle fixed seat 31. One ends of the baffle horizontal rails 33 are connected with the lateral plate 34 and the other ends of the baffle horizontal rails 33 are connected with the baffle 35. In this way, the baffle 35 is reciprocated together with the baffle fixed seat 31 between a lifting position A3 (as shown in FIG. 9) and a lowering position A4 (as shown in FIG. 10), and reciprocated along the baffle horizontal rails 33 between an initial position A1 (as shown in FIG. 10) and a compression position A2 (as shown in FIG. 8). In addition, the first stopper 36 is set to a front surface 35*a* of the baffle 35 and faces towards the baffle fixed seat 31. The second stopper 37*a* has a nut 371 fixed to one side of the baffle fixing seat 31 and a bolt 372 screwed to the nut 371 (as shown in FIG. 5). The third stopper 37*b* has a first stopping protrusion 373 disposed to the opposite side of the baffle fixing seat 31 and a second stopping protrusion 374 disposed to the lateral plate 34 (as shown in FIG. 5). In this way, when the baffle 35 is located at the initial position A1 as shown in FIG. 10, the first stopper 36 and the bolt 372 are separated from each other, and the first protrusion 373 and the second protrusion 374 are abutted against each other. When the baffle 35 is located at the compression position A2 as shown in FIG. 8, the first stopper 36 is abutted against the bolt 372 so as to be indirectly abutted against the baffle fixing seat 31, and at this time, the first protrusion 373 and the second protrusion 374 are in a non-touch state. The elastic member 38 (such as, but not limited to a compression spring as shown in FIGS. 2 to 5) is sleeved on one of the baffle horizontal rails 33 and abutted between the baffle fixed seat 31 and the baffle 35 to provide an elastic force to the baffle 35 for keeping the baffle 35 in the initial position A1. The roller 39 is disposed to the top end of the baffle 35 for abutting against the front abutting surface W1 or the rear abutting surface W2 of the plank W.

Figure 6:
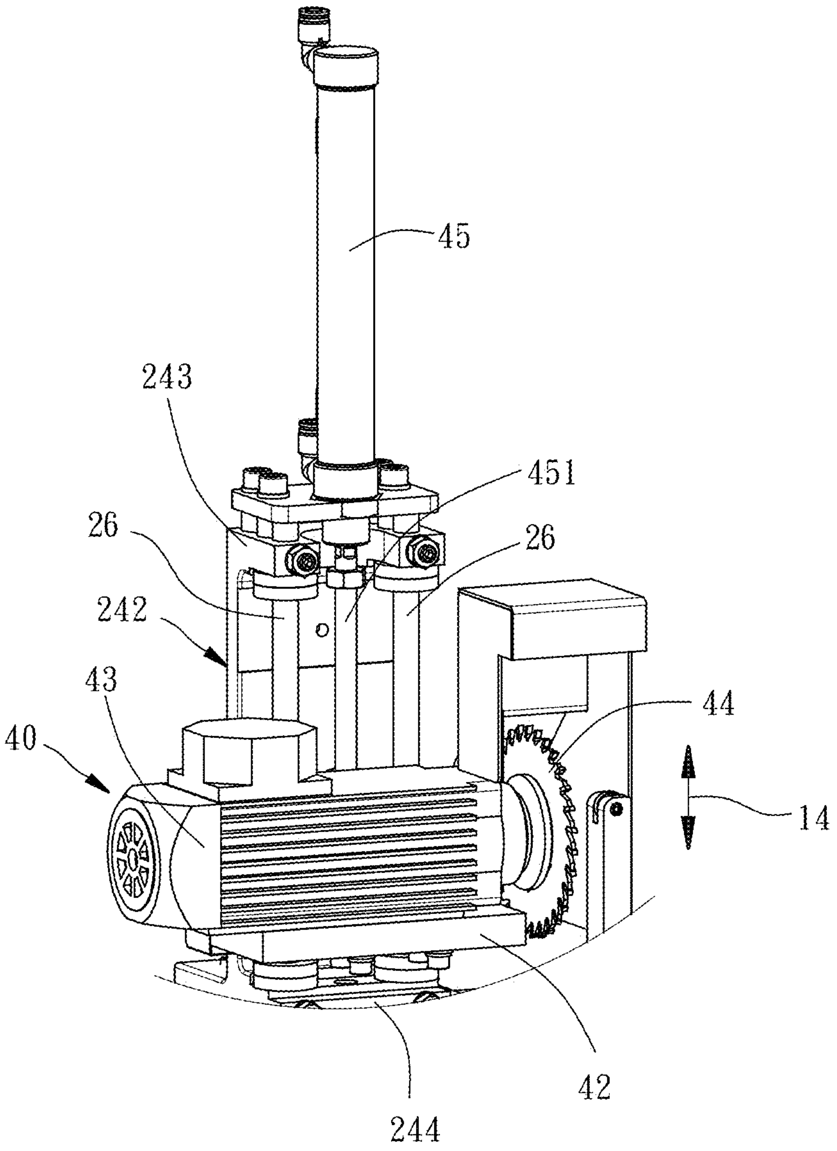
FIG. 6 is a partial perspective view of a cutting component provided by the edge cutting device of the present invention.

As shown in FIG. 6, the cutting component 40 includes a motor holder 42, a motor 43, a saw blade 44, and a cutting component driving cylinder 45. The motor holder 42 is located between the top arm plate 243 and the bottom arm plate 244 and penetrated by the vertical rails 26. The motor 43 is mounted to the motor holder 42. The saw blade 44 is connected with the motor 43 so as to be driven by the motor 43 to rotate. The cutting component driving cylinder 45 is set to the top arm plate 243 of the base 24 and provided with a rod 451 penetrated through the top arm plate 243 and connected with the motor 42, such that the cutting component driving cylinder 45 drives the motor holder 42 to reciprocate up and down along the vertical rails 26, and then drives the saw blade 44 to reciprocate up and down along a cutting path 14 vertical to the convey path 12 between a bottom dead point position B1 (as shown in FIG. 8) and a top dead point position B2 (as shown in FIG. 9).

Figure 8:
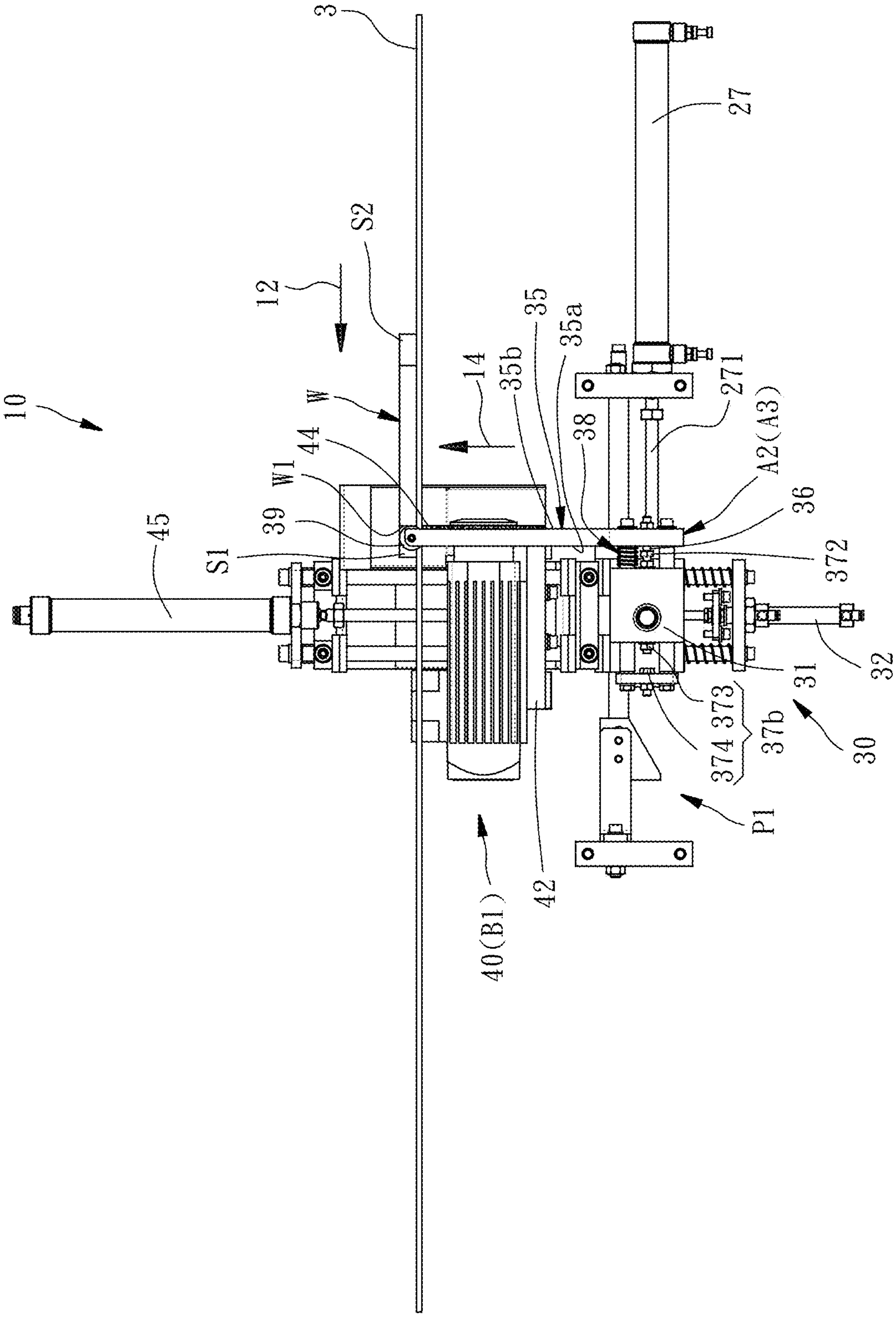
FIG. 8 is a plane view of the edge cutting device of the present invention used with the conveyor belt, showing that the base is located at the front cutting position, and the baffle is located at the compression position and the lifting position.

As shown in FIG. 7, when the plank W is about to reach the edge band cutting device 10 through the conveyor belt 3, the base driving cylinder 27 is started by the control system 9 to drive the base 2 together with the baffle component 30 and cutting component 40 to move to the front cutting position P1 (as shown in FIG. 8), and then the baffle component driving cylinder 32 is started by the control system 9 to drive the baffle fixed seat 31 to move the baffle 35 to the lifting position A3. At this time, the baffle 35 is maintained in the initial position A1 (as shown in FIG. 5) by the elastic force applied by the elastic member 38. When the plank W keeps going until the front abutting surface W1 is abutted against the roller 39, the plank 35 is moved from the initial position A1 to the compression position A2 (as shown in FIG. 8). At this time, the elastic member 38 is compressed, and the first stopper 36 and the bolt 372 of the second stopper 37*a* are abutted against each other for limiting the movement of the baffle 35, and the first stopping protrusion 373 and the second stopper protrusion 374 are in a non-contact state due to the movement of the baffle 35 (as shown in FIG. 8). Thereafter, the cutting component driving cylinder 45 is started by the control system 9 to drive the motor holder 42 together with the motor 43 to move along the cutting path 14 from the bottom dead point position B1 as shown in FIG. 8 to the top dead point position B2 as shown in FIG. 9. In this way, the front protrusion S1 of the edge band S is cut by the saw blade 44 assembled with the motor 43. It should be noted that in this embodiment, when the baffle 35 is located at the compression position A2, the rear surface 35*b* of the baffle 35 is flushed with the saw blade 44, and substantially the rear surface 35*b* of the baffle 35 is flushed with the saw blade 44 and the front abutting surface W1 of the plank W.

Figure 12:
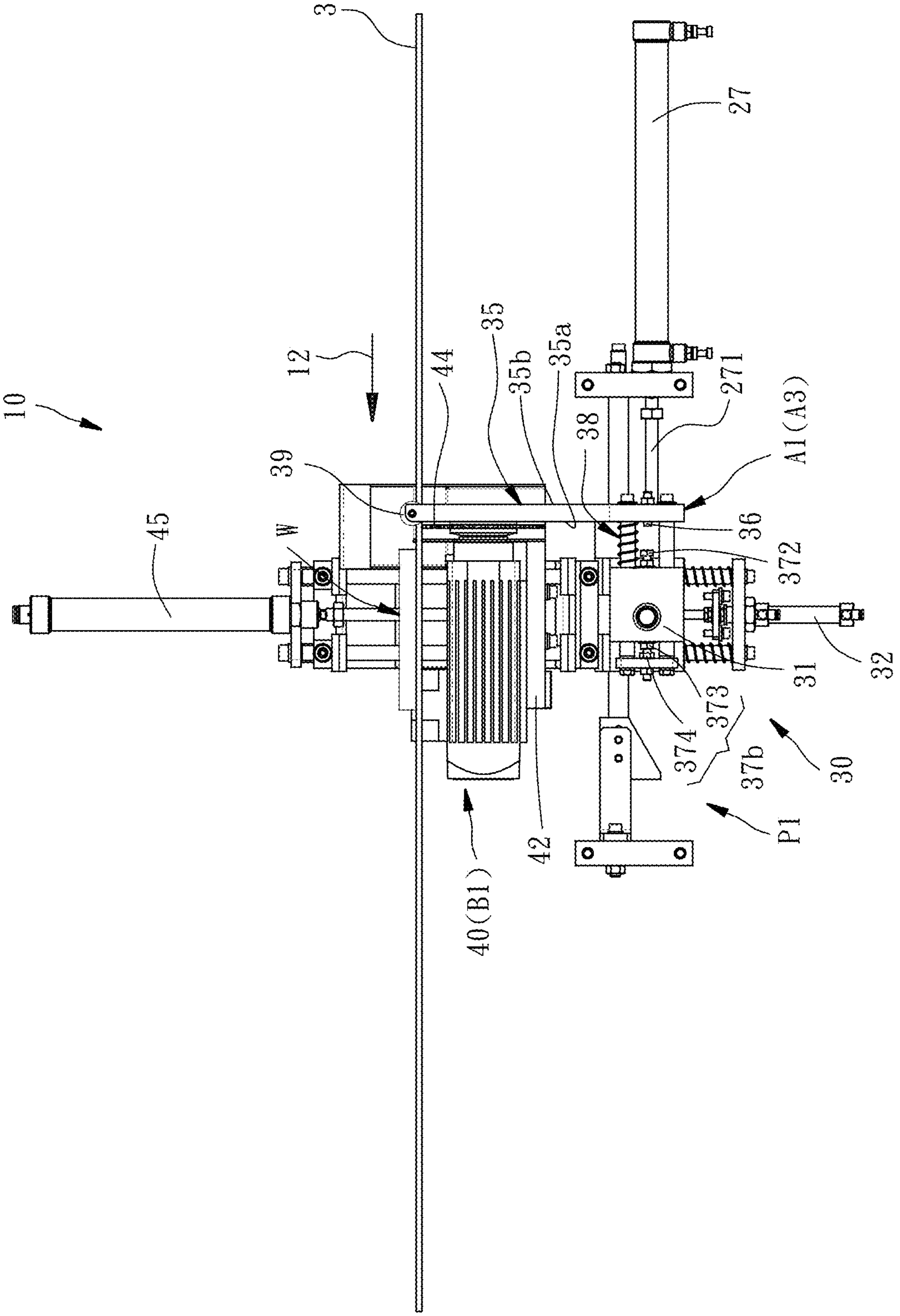
FIG. 12 is similar to FIG. 11, showing that the rear protrusion of the edge band is cut by the saw blade, and the saw blade is located at the bottom dead point position.

As shown in FIG. 9, after cutting the front protrusion S1 of the edge band S, the baffle component driving cylinder 32 is started by the control system 9 to drive the baffle fixed seat 31 to move the baffle 35 from the lifting position A3 as shown in FIG. 9 to the lowering position A4 as shown in FIG. 10 for enabling the roller 38 to leave the front abutting surface W1 of the plank W. At this time, the baffle 35 is back to the initial position A1 by the elastic force applied by the elastic member 38 and maintained in the initial position A1 by the abutment between the first stopping protrusion 373 and the second stopping protrusion 374 (as shown in FIG. 10), and further, the first stopper 36 and the bolt 372 of the second stopper 37*a* return a non-contact state. Thereafter, the plank W keeps going through the conveyor belt 3. The base driving cylinder 27 is started by the control system 9 to drive the base 24 to move the baffle component 30 and the cutting component 40 to the rear cutting position P2 (as shown in FIG. 11), and then the baffle component driving cylinder 32 is started by the control system 9 to drive the baffle fixed seat 31 to move the baffle 35 to the lifting position A3 again for enabling the roller 39 to abut against the rear abutting surface W2 of the plank W (as shown in FIG. 11). Next, the cutting component driving cylinder 45 is started by the control system 9 to drive the motor holder 42 to move the saw blade 43 along the cutting path 14 from the top dead point position B2 as shown in FIG. 11 to the bottom dead point position B1 as shown in FIG. 12. In this way, the rear protrusion S2 of the edge band S is cut by the saw blade 44 assembled with the motor 43. It should be noted that in this embodiment, when the baffle is located at the initial position A1, the front surface 35*a* of the baffle 35 is flushed with the saw blade 44, and substantially the front surface 35*a* of the baffle 35 is flushed with the saw blade 44 and the rear abutting surface W2 of the plank W. Finally, after cutting the rear protrusion S2 of the edge band S, the baffle 35 is maintained in the initial position A1 and the lifting position A3 (as shown in FIG. 11), and the saw blade 44 is back to the bottom dead point position B1 (as shown in FIG. 12), thereby preparing for the cutting of the next plank W. As a result, the entire edge band cutting process achieves the effects of automation, time-saving, and smoothing.

On the other hand, when the length specification of the plank W changes, the threaded length of the bolt 372 of the second stopper 37*a* can be adjusted to adjust the stroke of the baffle 35 (i.e., adjust the compression position A2). In this way, when the length specification of the plank W changes, the plank W is still maintained in the correct cutting position for processing, thereby enhancing cutting accuracy.

As indicated above, by the cooperation movement of the baffle component 30 and the cutting component 40, the edge band cutting device 10 of the present invention provides only one saw blade 44 to achieve the purpose of cutting the front and rear protrusions S1, S2 of the edge band S. Therefore, the structural design is simplified and the equipment cost is saved, and further, it is unnecessary for a user to adjust the position of the saw blade 44 due to the change of the specification of the plank W, thereby enhancing processing efficiency.

What is claimed is:

1. An edge band cutting device of an edge banding machine for cutting an edge band attached to one lateral side of a plank conveying along a conveying path and having a front protrusion protruding out of the lateral side of the plank and a rear protrusion protruding out of the lateral side of the plank, the edge band cutting device comprising:

a base reciprocated along a direction parallel to the conveying path between a front cutting position and a rear cutting position;

a baffle component disposed to the base and including a baffle configured to be reciprocated along a direction parallel to the conveying path between an initial position and a compression position, and reciprocated along a direction perpendicular to the conveying path between a lifting position and a lowering position; and a cutting component disposed to the base and including a saw blade configured to be reciprocated up and down along a cutting path perpendicular to the conveying path;

wherein when the base is located at the front cutting position, and the baffle is located at the initial position and located at the lifting position, the baffle is pushed by a front abutting surface of the plank to move from the initial position to the compression position for allowing the saw blade to move along the cutting path and cut the front protrusion of the edge band;

wherein when the base is located at the rear cutting position, and the baffle is located at the initial position and located at the lifting position, the baffle is abutted with a rear abutting surface of the plank for allowing the saw blade to move along the cutting path and cut the rear protrusion of the edge band.

2. The edge band cutting device as claimed in claim 1, wherein the base is reciprocated along a base rail arranged along a direction parallel to the conveying path between the front cutting position and the rear cutting position.

3. The edge band cutting device as claimed in claim 1, wherein the baffle component includes a baffle fixing seat mounted to the base, a baffle horizontal rail movably passing through the baffle fixing seat, a lateral plate disposed at one end of the baffle horizontal rail, the baffle disposed at the other end of the baffle horizontal rail, a first stopper disposed to the baffle, and an elastic member providing an elastic member to the baffle for keeping the baffle in the initial position; when the baffle is pushed by the front abutting surface of the plank to move from the initial position to the compression position, the first stopper is abutted against the baffle fixing seat to limit the position of the baffle.

4. The edge band cutting device as claimed in claim 3, wherein the baffle component further includes a second stopper disposed to the baffle fixing seat; when the baffle is pushed by the front abutting surface of the plank to move from the initial position to the compression position, the first stopper is abutted against the second stopper so as to be indirectly abutted against the baffle fixing seat; the second stopper includes a nut fixed to the baffle fixing seat, and a bolt screwed to the nut and abutted against the first stopper when the baffle is located at the compression position.

5. The edge band cutting device as claimed in claim 3, wherein a vertical rail is provided to the base and arranged a direction vertical to the conveying path; the baffle fixing seat is driven by a baffle component driving cylinder to reciprocate up and down along the vertical rail so as to drive the baffle to move between the lifting position and the lowering position.

6. The edge band cutting device as claimed in claim 3, wherein a vertical rail is provided to the base and arranged a direction vertical to the conveying path; the cutting component includes a motor holder, a motor mounted to the motor holder, the saw blade driven by the motor to rotate, and a cutting component driving cylinder mounted to the base; the cutting component driving cylinder drives the motor holder to reciprocate up and down along the vertical rail so as to drive the saw blade to reciprocate up and down along the cutting path between a top dead point position and a bottom dead point position.

7. The edge band cutting device as claimed in claim 3, wherein the baffle has a front surface and a rear surface; when the baffle is located at the compression position, the rear surface of the baffle is flushed with the saw blade, and when the baffle is located at the initial position, the front surface of the baffle is flushed with the saw blade.

8. The edge band cutting device as claimed in claim 3, wherein the baffle component further includes a third stopper having a first stopping protrusion disposed to the baffle fixing seat and a second stopping protrusion disposed to the lateral plate; when the baffle is not pushed by the front abutting surface of the plank so as to be moved from the compression position to the initial position, the elastic member applies the elastic force to the baffle, and the first stopping protrusion is abutted against the second stopping protrusion for keeping the baffle in the initial position.

9. The edge band cutting device as claimed in claim 1, wherein the baffle component further includes a roller disposed to the baffle for abutting against the front abutting surface or the rear abutting surface of the plank.

10. The edge band cutting device as claimed in claim 1, wherein when the base is located at the front cutting position, and the baffle located at the compression position is located at the lifting position, the saw blade is located at a bottom dead point position so as to be moved from bottom to up along the cutting path to cut the front protrusion of the edge band; when the base is located at the rear cutting position, and the baffle located at the initial position is located at the lifting position, the saw blade is located at a top dead point position so as to be moved from up to bottom along the cutting path to cut the rear protrusion of the edge band.

* * * * *